(12) United States Patent
Scott

(10) Patent No.: US 10,875,076 B2
(45) Date of Patent: Dec. 29, 2020

(54) TAPERED METAL CUP AND METHOD OF FORMING THE SAME

(71) Applicant: Ball Corporation, Broomfield, CO (US)

(72) Inventor: Anthony J. Scott, Westminster, CO (US)

(73) Assignee: BALL CORPORATION, Broomfield, CO (US)

( * ) Notice: Subject to any disclaimer, the term of this patent is extended or adjusted under 35 U.S.C. 154(b) by 205 days.

(21) Appl. No.: 15/811,032

(22) Filed: Nov. 13, 2017

(65) Prior Publication Data
US 2018/0221936 A1    Aug. 9, 2018

Related U.S. Application Data

(60) Provisional application No. 62/455,697, filed on Feb. 7, 2017.

(51) Int. Cl.
| | |
|---|---|
| B21D 51/10 | (2006.01) |
| B21D 51/26 | (2006.01) |
| B65D 1/26 | (2006.01) |
| A47G 19/23 | (2006.01) |
| B65D 1/00 | (2006.01) |

(52) U.S. Cl.
CPC ............ *B21D 51/10* (2013.01); *A47G 19/23* (2013.01); *B21D 51/2646* (2013.01); *B65D 1/00* (2013.01); *B65D 1/265* (2013.01)

(58) Field of Classification Search
CPC .... B21D 51/10; B21D 51/26; B21D 51/2646; B21D 51/2669; B21D 51/28; B21D 22/30; B21D 51/2623; B21D 51/2638
See application file for complete search history.

(56) References Cited

U.S. PATENT DOCUMENTS

| | | |
|---|---|---|
| 348,079 A | 8/1886 | Wellman |
| 671,427 A | 4/1901 | Anderson |
| 1,884,903 A | 10/1932 | Squires |
| 1,942,930 A | 1/1934 | Ludington |
| 1,967,245 A | 7/1934 | Hothersall |
| 2,402,068 A | 6/1946 | Meador |
| 2,905,350 A | 9/1959 | Edwards |
| 2,969,030 A | 1/1961 | Kahn et al. |

(Continued)

FOREIGN PATENT DOCUMENTS

| | | |
|---|---|---|
| BR | 7401492 | 8/1996 |
| BR | 20-2017-016121 | 1/2020 |

(Continued)

OTHER PUBLICATIONS

International Preliminary Report on Patentability for International (PCT) Patent Application No. PCT/US2017/062582, dated Aug. 22, 2019, 9 pages.

(Continued)

*Primary Examiner* — Teresa M Ekiert
*Assistant Examiner* — Jared O Brown
(74) *Attorney, Agent, or Firm* — Sheridan Ross P.C.

(57) ABSTRACT

A metal cup and method of forming the same is provided. Metal cups of the present disclosure comprise a plurality of thin, straight-walled sections and a tapered profile. A domed portion is provided in the bottom of the cup. The cup may comprise a disposable cup, a reusable cup, or a recyclable cup.

6 Claims, 10 Drawing Sheets

(56) References Cited

U.S. PATENT DOCUMENTS

| | | |
|---|---|---|
| 3,009,603 A | 11/1961 | Stockdale |
| 3,079,027 A | 2/1963 | Edwards |
| 3,128,029 A | 4/1964 | Price et al. |
| 3,139,213 A | 6/1964 | Edwards |
| D199,336 S | 10/1964 | Wanderer |
| 3,157,335 A | 11/1964 | Maier |
| 3,169,688 A | 2/1965 | Schad |
| 3,223,305 A | 12/1965 | Edwards |
| 3,262,626 A | 7/1966 | Davis |
| 3,342,370 A | 9/1967 | Johnson |
| 3,372,830 A | 3/1968 | Edwards |
| D210,767 S | 4/1968 | Anglada |
| 3,375,954 A | 4/1968 | Honkanen et al. |
| 3,443,714 A | 5/1969 | Edwards |
| 3,811,393 A | 5/1974 | Close |
| 3,814,040 A | 6/1974 | Habash |
| 3,850,361 A | 11/1974 | Day et al. |
| 3,927,766 A | 12/1975 | Day |
| 3,995,572 A | 12/1976 | Saunders |
| 4,040,537 A | 8/1977 | Edwards |
| 4,049,122 A * | 9/1977 | Maxwell ............ B21D 51/2646 206/519 |
| 4,052,037 A | 10/1977 | Mair et al. |
| 4,082,184 A | 4/1978 | Hammer |
| 4,111,303 A | 9/1978 | Compton |
| 4,124,120 A | 11/1978 | Day |
| 4,134,354 A | 1/1979 | Cvacho et al. |
| 4,231,476 A | 11/1980 | Compton et al. |
| 4,263,800 A | 4/1981 | Arfert et al. |
| 4,366,696 A | 1/1983 | Durgin et al. |
| 4,386,514 A | 6/1983 | Herten |
| 4,420,081 A | 12/1983 | Dart |
| D272,794 S | 2/1984 | Dart |
| 4,503,702 A | 3/1985 | Bulso, Jr. et al. |
| D280,078 S | 8/1985 | Fortuna |
| D283,387 S | 4/1986 | Durand |
| D287,919 S | 1/1987 | Clements |
| D298,394 S | 11/1988 | Brewer |
| 4,782,685 A | 11/1988 | Bulso, Jr. et al. |
| 4,832,202 A | 5/1989 | Newman et al. |
| 4,846,350 A | 7/1989 | Sorensen |
| 4,914,937 A | 4/1990 | Bulso, Jr. et al. |
| 5,014,536 A | 5/1991 | Saunders |
| 5,105,645 A | 4/1992 | Kobayashi et al. |
| D339,744 S | 9/1993 | Seppala |
| D345,081 S | 3/1994 | Adami et al. |
| D350,695 S | 9/1994 | Adami et al. |
| D352,239 S | 11/1994 | Adami et al. |
| D354,227 S | 1/1995 | Adami et al. |
| D356,733 S | 3/1995 | Adami et al. |
| 5,427,269 A | 6/1995 | Willbrandt |
| D360,133 S | 7/1995 | Boller |
| 5,487,295 A | 1/1996 | Diekhoff et al. |
| D373,931 S | 9/1996 | Whitehead |
| 5,555,992 A | 9/1996 | Sedgeley |
| D375,259 S | 11/1996 | Whitehead |
| 5,626,048 A | 5/1997 | McClung |
| D379,738 S | 6/1997 | Liming et al. |
| D381,558 S | 7/1997 | Schaefer et al. |
| D382,200 S | 8/1997 | Brondyke et al. |
| D382,201 S | 8/1997 | Brondyke et al. |
| 5,657,897 A | 8/1997 | Schwartzburg |
| D383,947 S | 9/1997 | Schaefer |
| 5,755,354 A | 5/1998 | Lang |
| D399,744 S | 10/1998 | Gross |
| 5,992,632 A | 11/1999 | Karren |
| D418,371 S | 1/2000 | Whitehead |
| 6,010,028 A * | 1/2000 | Jordan .................... B21D 51/26 215/44 |
| 6,038,910 A * | 3/2000 | McClung ............... B21D 22/26 72/348 |
| 6,065,603 A | 5/2000 | Filice et al. |
| D436,295 S | 1/2001 | Furman et al. |
| D436,499 S | 1/2001 | Pritchard et al. |
| D440,155 S | 4/2001 | Schaefer |
| D441,252 S | 5/2001 | Gitschlag |
| 6,233,999 B1 | 5/2001 | Yabutani et al. |
| D446,687 S | 8/2001 | Furman et al. |
| D449,986 S | 11/2001 | Schaefer |
| 6,382,449 B1 | 5/2002 | Kazmierski et al. |
| D458,807 S | 6/2002 | Trazzi |
| 6,442,991 B1 | 9/2002 | Rojek |
| 6,463,776 B1 | 10/2002 | Enoki et al. |
| 6,497,338 B1 | 12/2002 | Stolzman |
| D469,691 S | 2/2003 | Brondyke et al. |
| D473,134 S | 4/2003 | Nuzzo |
| 6,554,154 B1 | 4/2003 | Chauhan et al. |
| D475,243 S | 6/2003 | Trazzi |
| D476,566 S | 7/2003 | Smith et al. |
| D476,891 S | 7/2003 | Clarke et al. |
| D477,223 S | 7/2003 | Smith et al. |
| D478,006 S | 8/2003 | Smith et al. |
| D483,225 S | 12/2003 | Gain |
| D485,758 S | 1/2004 | Clarke et al. |
| D486,994 S | 2/2004 | Smith et al. |
| D487,214 S | 3/2004 | Rutter et al. |
| D487,669 S | 3/2004 | Smith et al. |
| D489,254 S | 5/2004 | Kocis et al. |
| D489,260 S | 5/2004 | Smith et al. |
| D490,655 S | 6/2004 | Zettle et al. |
| D494,816 S | 8/2004 | Wiedmeyer et al. |
| D494,817 S | 8/2004 | Rutter et al. |
| D496,825 S | 10/2004 | Wiedmeyer et al. |
| D497,774 S | 11/2004 | Smith et al. |
| D498,980 S | 11/2004 | Smith et al. |
| D499,304 S | 12/2004 | Wiedmeyer et al. |
| D499,933 S | 12/2004 | Rutter et al. |
| D499,934 S | 12/2004 | Smith et al. |
| D499,935 S | 12/2004 | Smith et al. |
| D499,936 S | 12/2004 | Wiedmeyer et al. |
| D504,593 S | 5/2005 | Smith et al. |
| D505,830 S | 6/2005 | Smith et al. |
| D507,158 S | 7/2005 | Smith et al. |
| D507,461 S | 7/2005 | Smith et al. |
| D508,822 S | 8/2005 | Smith et al. |
| D510,679 S | 10/2005 | Smith et al. |
| D511,647 S | 11/2005 | Smith et al. |
| D511,932 S | 11/2005 | Smith et al. |
| D514,380 S | 2/2006 | Smith et al. |
| D514,385 S | 2/2006 | Smith et al. |
| D514,444 S | 2/2006 | Smith et al. |
| D514,445 S | 2/2006 | Smith et al. |
| D514,884 S | 2/2006 | Smith et al. |
| D514,886 S | 2/2006 | Kingsley |
| D515,866 S | 2/2006 | Wiedmeyer et al. |
| D516,378 S | 3/2006 | Smith et al. |
| D519,751 S | 5/2006 | Etter |
| D526,847 S | 8/2006 | Freeman |
| D528,863 S | 9/2006 | Hayes et al. |
| D530,602 S | 10/2006 | Boller et al. |
| 7,117,066 B2 | 10/2006 | Mannlein et al. |
| 7,121,991 B2 | 10/2006 | Mannlein et al. |
| D531,854 S | 11/2006 | Bresler |
| D533,411 S | 12/2006 | Webb et al. |
| D533,748 S | 12/2006 | Bresler |
| D535,561 S | 1/2007 | Smith et al. |
| D535,822 S | 1/2007 | Smith et al. |
| D536,249 S | 2/2007 | Smith et al. |
| D537,677 S | 3/2007 | Bresler |
| D539,094 S | 3/2007 | Wasserman et al. |
| D539,649 S | 4/2007 | Smith et al. |
| D539,650 S | 4/2007 | Smith et al. |
| D540,167 S | 4/2007 | Smith et al. |
| D544,755 S | 6/2007 | Diesman |
| 7,281,649 B2 | 10/2007 | Pyper, Jr. |
| D554,498 S | 11/2007 | Lovett |
| D554,531 S | 11/2007 | Lovett |
| D563,727 S | 3/2008 | Lovett |
| D568,687 S | 5/2008 | Lovett |
| D570,159 S | 6/2008 | McGill |
| D571,655 S | 6/2008 | Lovett |
| D573,408 S | 7/2008 | Lovett |
| D573,409 S | 7/2008 | Lovett |
| D575,990 S | 9/2008 | Altiner et al. |

(56) References Cited

U.S. PATENT DOCUMENTS

| | | |
|---|---|---|
| D577,995 S | 10/2008 | Lovett |
| D578,387 S | 10/2008 | Lovett |
| D578,877 S | 10/2008 | Lovett |
| D589,300 S | 3/2009 | Altiner et al. |
| D589,301 S | 3/2009 | Altiner et al. |
| 7,546,932 B2 | 6/2009 | Smith et al. |
| D596,499 S | 7/2009 | Willis et al. |
| D596,903 S | 7/2009 | Willis et al. |
| D607,692 S | 1/2010 | Skala |
| D608,591 S | 1/2010 | Hillebrenner et al. |
| D609,513 S | 2/2010 | Koennecke et al. |
| D609,531 S | 2/2010 | Koennecke |
| D609,532 S | 2/2010 | Koennecke |
| D609,976 S | 2/2010 | Koennecke |
| 7,661,286 B2 | 2/2010 | Warmbrunn |
| D611,384 S | 3/2010 | Biegel |
| D612,201 S | 3/2010 | Hillebrenner |
| D612,202 S | 3/2010 | Hillebrenner |
| D613,554 S | 4/2010 | Koennecke |
| D615,356 S | 5/2010 | Hillebrenner |
| D620,790 S | 8/2010 | Lovett |
| D622,105 S | 8/2010 | Koennecke et al. |
| D624,788 S | 10/2010 | Koennecke |
| D626,863 S | 11/2010 | Lovett |
| D627,596 S | 11/2010 | Hillebrenner et al. |
| D628,436 S | 12/2010 | Koennecke et al. |
| D628,437 S | 12/2010 | Koennecke et al. |
| D631,513 S | 1/2011 | Weinert |
| D635,855 S | 4/2011 | Smith et al. |
| D636,229 S | 4/2011 | Koennecke |
| D636,230 S | 4/2011 | Koennecke |
| 7,934,410 B2 | 5/2011 | Myers et al. |
| D639,606 S | 6/2011 | Koennecke |
| D641,590 S | 7/2011 | Koennecke |
| D650,634 S | 12/2011 | Hodge et al. |
| D651,452 S | 1/2012 | Hillebrenner et al. |
| D655,573 S | 3/2012 | O'Connor |
| D655,574 S | 3/2012 | O'Connor |
| D664,003 S | 7/2012 | Nagoya |
| D664,844 S | 8/2012 | Hale |
| D667,271 S | 9/2012 | Fishman |
| D667,272 S | 9/2012 | Fishman |
| D674,663 S | 1/2013 | Cahen |
| D675,482 S | 2/2013 | Heggestad et al. |
| 8,387,816 B2 | 3/2013 | Fallas |
| D679,947 S | 4/2013 | Romley |
| D680,377 S | 4/2013 | Romley |
| D680,378 S | 4/2013 | Romley |
| D684,051 S | 6/2013 | Winstanley et al. |
| D684,869 S | 6/2013 | Pellaud et al. |
| D688,553 S | 8/2013 | Winstanley et al. |
| D689,377 S | 9/2013 | Maxwell-Wood |
| 8,556,099 B2 | 10/2013 | Perlman |
| D696,582 S | 12/2013 | Ramsey et al. |
| D696,583 S | 12/2013 | Ramsey et al. |
| D696,593 S | 12/2013 | Farrow et al. |
| 8,616,418 B2 | 12/2013 | Painchaud et al. |
| D696,940 S | 1/2014 | Hale et al. |
| D699,595 S | 2/2014 | Farrow et al. |
| 8,727,151 B2 | 5/2014 | Valles et al. |
| D707,568 S | 6/2014 | Stephens et al. |
| 8,746,488 B2 | 6/2014 | Caunter et al. |
| D711,228 S | 8/2014 | Gailly |
| D711,246 S | 8/2014 | Hanson et al. |
| D712,753 S | 9/2014 | Stephens et al. |
| D713,268 S | 9/2014 | Jones et al. |
| D715,162 S | 10/2014 | Farrow et al. |
| D717,605 S | 11/2014 | Kristinik |
| D717,606 S | 11/2014 | Kristinik |
| 8,920,892 B2 | 12/2014 | Hernandez |
| D721,887 S | 2/2015 | Romley |
| D722,823 S | 2/2015 | Del Mar Menendez |
| 8,973,777 B2 | 3/2015 | Ramsey et al. |
| D732,343 S | 6/2015 | Romley |
| D732,402 S | 6/2015 | Jones et al. |
| 9,044,082 B2 | 6/2015 | Kusuma et al. |
| D739,731 S | 9/2015 | Jones |
| D739,732 S | 9/2015 | Jones |
| 9,156,583 B2 | 10/2015 | Howard et al. |
| D744,833 S | 12/2015 | Cotton |
| D744,861 S | 12/2015 | Fortner |
| D745,396 S | 12/2015 | Jahina et al. |
| D745,397 S | 12/2015 | Gogola et al. |
| D745,398 S | 12/2015 | Cotton |
| D745,399 S | 12/2015 | Cotton |
| D747,925 S | 1/2016 | Engler et al. |
| 9,254,514 B2 | 2/2016 | Farnham |
| D751,922 S | 3/2016 | Ramsey et al. |
| 9,321,555 B2 | 4/2016 | Roodnat et al. |
| D756,705 S | 5/2016 | Abrams et al. |
| D756,709 S | 5/2016 | Weitman |
| 9,327,899 B2 | 5/2016 | Greenfield et al. |
| 9,348,345 B2 | 5/2016 | Leser et al. |
| 9,440,410 B2 | 9/2016 | Marshall |
| 9,468,971 B2 | 10/2016 | Yarnagata et al. |
| D772,079 S | 11/2016 | Ramsey et al. |
| D772,080 S | 11/2016 | Ramsey |
| D772,713 S | 11/2016 | Chapman et al. |
| D772,726 S | 11/2016 | Ramsey |
| 9,499,327 B2 | 11/2016 | D'Amato |
| D779,974 S | 2/2017 | Florkeiwicz et al. |
| D779,975 S | 2/2017 | Arranz et al. |
| D780,601 S | 3/2017 | Arranz et al. |
| 9,617,043 B2 | 4/2017 | McGirr et al. |
| D786,703 S | 5/2017 | Chapman et al. |
| D790,277 S | 6/2017 | Mackesy, II et al. |
| 9,700,929 B2 | 7/2017 | Fedusa et al. |
| 9,713,906 B2 | 7/2017 | Chapman et al. |
| D796,905 S | 9/2017 | Kestenbaum |
| D797,510 S | 9/2017 | Ke |
| D797,512 S | 9/2017 | O'Connor |
| 9,758,292 B2 | 9/2017 | Leser et al. |
| 9,758,293 B2 | 9/2017 | Leser et al. |
| 9,771,206 B2 | 9/2017 | Marshall |
| D799,268 S | 10/2017 | Gschwandtl et al. |
| 9,783,359 B2 | 10/2017 | D'Amato |
| 9,789,992 B2 | 10/2017 | Fortner |
| D808,271 S | 1/2018 | Weyer et al. |
| 9,868,564 B2 | 1/2018 | McGirr et al. |
| 9,895,737 B2 | 2/2018 | Caunter et al. |
| 9,902,552 B2 | 2/2018 | Bilko |
| 10,099,840 B2 | 10/2018 | Frost et al. |
| D833,224 S | 11/2018 | Wahlkvist |
| 10,239,648 B2 | 3/2019 | Lord et al. |
| 10,286,437 B2 | 5/2019 | Golding |
| 10,478,000 B2 | 11/2019 | Choi et al. |
| D871,151 S | 12/2019 | Hudson |
| 2004/0031714 A1 | 2/2004 | Hanson |
| 2005/0061821 A1 | 3/2005 | Bone et al. |
| 2005/0189361 A1 | 9/2005 | Bresler |
| 2005/0230401 A1 | 10/2005 | Hanson |
| 2006/0277957 A1* | 12/2006 | Fujishige ............... B21D 51/26 72/46 |
| 2007/0029320 A1 | 2/2007 | Bouie et al. |
| 2007/0295051 A1* | 12/2007 | Myers ................... B21D 39/20 72/379.4 |
| 2008/0128481 A1 | 6/2008 | Robertson |
| 2009/0026214 A1 | 1/2009 | Yuan et al. |
| 2010/0247830 A1 | 9/2010 | Hernandez |
| 2011/0248040 A1 | 10/2011 | McGregor |
| 2012/0282482 A1 | 11/2012 | Flehmig et al. |
| 2013/0160517 A1* | 6/2013 | Fedusa ............... B21D 51/2615 72/338 |
| 2014/0048440 A1 | 2/2014 | Prickett, Jr. |
| 2014/0166655 A1 | 6/2014 | Combe |
| 2014/0308407 A1 | 10/2014 | Ramsey et al. |
| 2014/0374428 A1 | 12/2014 | Watson et al. |
| 2015/0041480 A1 | 2/2015 | Ramsey |
| 2015/0122817 A1 | 5/2015 | Maxwell-Wood |
| 2015/0208839 A1 | 7/2015 | Shalmoni |
| 2015/0217907 A1 | 8/2015 | Combe |
| 2015/0257559 A1 | 9/2015 | Shalmoni |
| 2015/0289691 A1 | 10/2015 | Azuma et al. |
| 2015/0343516 A1 | 12/2015 | Schremmer et al. |

(56) References Cited

U.S. PATENT DOCUMENTS

| | | |
|---|---|---|
| 2015/0344166 A1 | 12/2015 | Davis et al. |
| 2016/0031594 A1 | 2/2016 | Ramsey et al. |
| 2016/0075503 A1 | 3/2016 | Ramsey et al. |
| 2016/0368650 A1 | 12/2016 | Davis et al. |
| 2017/0050800 A1 | 2/2017 | Gain |
| 2017/0095852 A1 | 4/2017 | Carstens et al. |
| 2017/0251852 A1 | 9/2017 | O'Nan et al. |
| 2017/0267415 A1 | 9/2017 | Olson et al. |
| 2017/0305647 A1 | 10/2017 | Golding |
| 2018/0044074 A1 | 2/2018 | Combe et al. |
| 2018/0057247 A1 | 3/2018 | Marshall |
| 2018/0127195 A1 | 5/2018 | Ramsey |
| 2018/0134460 A1 | 5/2018 | Ramsey |
| 2018/0140118 A1* | 5/2018 | Ma .................. B21D 51/26 |
| 2018/0194517 A1 | 7/2018 | Brooks |
| 2018/0228314 A1 | 8/2018 | Putnam |

FOREIGN PATENT DOCUMENTS

| | | |
|---|---|---|
| CA | 872628 | 6/1971 |
| CA | 143472 | 6/2012 |
| CA | 143473 | 6/2012 |
| CA | 143474 | 6/2012 |
| CA | 145174 | 3/2013 |
| CA | 145175 | 3/2013 |
| CA | 145176 | 3/2013 |
| CA | 148031 | 11/2013 |
| CA | 148032 | 11/2013 |
| CA | 150408 | 1/2014 |
| CA | 150409 | 1/2014 |
| CA | 152297 | 5/2014 |
| CA | 152298 | 5/2014 |
| CA | 171072 | 7/2017 |
| CA | 174457 | 7/2017 |
| CN | 2475320 | 2/2002 |
| CN | 2617692 | 5/2004 |
| CN | 2751691 | 1/2006 |
| CN | 2930414 | 8/2007 |
| CN | 201551057 | 8/2010 |
| CN | 201602531 | 10/2010 |
| CN | 301677030 | 9/2011 |
| CN | 301740222 | 11/2011 |
| CN | 202681458 | 1/2013 |
| CN | 202722936 | 2/2013 |
| CN | 202950502 | 5/2013 |
| CN | 104907451 | 9/2015 |
| CN | 205144216 | 4/2016 |
| CN | 206466360 | 9/2017 |
| CN | 209003460 | 6/2019 |
| CN | 209152977 | 7/2019 |
| CN | 209252321 | 8/2019 |
| CN | 209421623 | 9/2019 |
| CN | 305359992 | 9/2019 |
| CN | 305424984 | 11/2019 |
| DE | 28227722 | 12/1978 |
| DE | 2312116 | 2/1982 |
| DE | 2639154 | 4/1985 |
| DE | 2554907 | 8/1987 |
| DE | 3418849 | 8/1992 |
| DE | 29920952 | 3/2000 |
| DE | 10-2006-053325 | 2/2016 |
| EM | 007094115-0001 | 11/2019 |
| EM | 006633202-0002 | 1/2020 |
| EP | 0090639 | 10/1983 |
| EP | 0076807 | 12/1985 |
| EP | 0460739 | 12/1991 |
| EP | 0852974 | 4/2002 |
| EP | 1254842 | 6/2004 |
| EP | 1529575 | 5/2005 |
| EP | 1876106 | 10/2008 |
| EP | 2662295 | 11/2013 |
| EP | 2662296 | 11/2013 |
| EP | 2768741 | 8/2014 |
| EP | 2958812 | 1/2017 |
| FR | 2229243 | 12/1974 |
| FR | 2758703 | 7/1998 |
| FR | 2926797 | 12/2012 |
| FR | 2988377 | 9/2013 |
| FR | 2993868 | 1/2014 |
| GB | 558436 | 1/1944 |
| GB | 976178 | 11/1964 |
| GB | 1096451 | 12/1967 |
| GB | 1261531 | 1/1972 |
| GB | 1261816 | 1/1972 |
| GB | 1376603 | 12/1974 |
| GB | 1458505 | 12/1976 |
| GB | 2077177 | 12/1981 |
| GB | 1007349 | 3/1983 |
| GB | 2484149 | 4/2012 |
| HK | 1254165 | 7/2019 |
| JP | S58-005934 | 1/1983 |
| JP | H01-150418 | 6/1989 |
| JP | H07-052937 | 2/1995 |
| JP | 2610958 | 5/1997 |
| JP | 2869683 | 3/1999 |
| JP | 3614244 | 1/2005 |
| JP | 2006-224108 | 8/2006 |
| JP | 2006-224113 | 8/2006 |
| JP | 4263000 | 5/2009 |
| JP | 04273735 | 6/2009 |
| JP | 04334861 | 9/2009 |
| JP | 2009-541066 | 11/2009 |
| JP | 2012-161844 | 8/2012 |
| JP | 5120807 | 1/2013 |
| JP | 5262872 | 8/2013 |
| JP | 2015-506842 | 3/2015 |
| JP | 5985655 | 9/2016 |
| KR | 1228537 | 3/2013 |
| MX | 199600207 | 11/1998 |
| RU | 00087794 | 2/2014 |
| TW | 201116456 | 5/2011 |
| TW | 201117754 | 6/2011 |
| WO | WO 82/03576 | 10/1982 |
| WO | WO 96/00169 | 1/1996 |
| WO | WO 99/59896 | 11/1999 |
| WO | WO 2005/085074 | 9/2005 |
| WO | WO 2009/090224 | 7/2009 |
| WO | WO 2009/115377 | 9/2009 |
| WO | WO 2009/130043 | 10/2009 |
| WO | WO 2010/122161 | 10/2010 |
| WO | WO 2011/004013 | 1/2011 |
| WO | WO 2011/023644 | 3/2011 |
| WO | WO 2011/053776 | 5/2011 |
| WO | WO 2012/056018 | 5/2012 |
| WO | WO 2012/136677 | 10/2012 |
| WO | WO 2013/002363 | 1/2013 |
| WO | WO 2013/010875 | 1/2013 |
| WO | WO 2013/068292 | 5/2013 |
| WO | WO 2013/096636 | 6/2013 |
| WO | WO 2013/124418 | 8/2013 |
| WO | WO 2013/164482 | 11/2013 |
| WO | WO 2013/190264 | 12/2013 |
| WO | WO 2014/027180 | 2/2014 |
| WO | WO 2015/177167 | 11/2015 |
| WO | WO 2015/181792 | 12/2015 |
| WO | WO 2016/166112 | 10/2016 |
| WO | WO 2018/052973 | 3/2018 |
| WO | WO 2018/109110 | 6/2018 |
| WO | WO 2018/147916 | 8/2018 |

OTHER PUBLICATIONS

Official Action for Canadian Patent Application No. 184558, dated Oct, 22, 2019, 2 pages.
Official Action for Russian Patent Application No. 2019500757, dated Aug, 9, 2019, 12 pages.
"King of Beer Pong Stainless Steel Beer Pong Cups," Tailgating Ideas, © 2017, 8 pages [retrieved online from: www.tailgatingideas.com/king-of-beer-pong-stainless-steel-beer-pong-cups/].
International Search Report and Written Opinion for International (PCT) Patent Application No. PCT/US2017/062582, dated Feb. 1, 2018 10 pages.
U.S. Appl. No. 16/703,558, filed Dec. 4, 2019, Scott.

(56) References Cited

OTHER PUBLICATIONS

Notice of Allowance for Chinese Patent Application No. 201830676015. 9, dated Nov. 4, 2019, 5 pages.
Official Action (no English translation available) for Chinese Patent Application No. 201930288129.0, dated Oct. 18, 2019, 2 pages.
U.S. Appl. No. 29/724,469, filed Feb. 14, 2020, Scott.
International Search Report and Written Opinion for International (PCT) Patent Application No. PCT/US2019/064905, dated Feb. 25, 2020, 11 pages.
Official Action for Canadian Patent Application No. 184558, dated Jan. 31, 2020. 1 page.
Official Action for Canadian Patent Application No. 184556, dated Feb. 17, 2020, 4 pages.
Notice of Allowance (with English translation) for Chinese Patent Application No. 201930288129.0, dated Jan. 17, 2020, 5 pages.
Official Action for Australian Patent Application No. 201917418, dated Feb. 6, 2020, 3 pages.
Official Action for Australian Patent Application No. 2017398102, dated May 4, 2020, 4 pages.
Ex Parte Quayle Action for U.S. Appl. No. 29/648,897, dated May 21, 2020, 8 pages.
Official Action for U.S. Appl. No. 29/672,428, dated May 21, 2020, 8 pages.
Official Action (with English translation) for Chinese Patent Application No. 201780088249.4, dated Jul. 3, 2020, 24 pages.
Third Party Observation (no English translation available) for Japanese Patent Application No. 2019-542624, dated Jun. 10, 2020, 1 page.
Notice of Allowance (no English translation available) for Russian Patent Application No. 2019505890, dated Sep. 16, 2020.
Notice of Allowance (no English translation available) for Russian Patent Application No. 2020501691, dated Sep. 16. 2020, 28 pages.
Notice of Allowance (no English translation available) for Russian Patent Application No. 2020501693, dated Sep. 16. 2020, 28 pages.
Notice of Allowance (no English translation available) for Russian Patent Application No, 2020501694, dated Sep. 16. 2020, 28 pages.
Official Action (no English translation available) for Russian Patent Application No. 2020503627, dated Sep. 10, 2020, 2 pages.
Official Action for U.S. Appl. No. 29/672,428, dated Sep. 2, 2020, 6 pages.
Official Action for Canadian Patent Application No. 187858, dated Jul, 7, 2020, 2 pages.
Notice of Allowance for U.S. Appl. No. 29/648,897, dated Jul. 20, 2020, 6 pages.
Official Action for U.S. Appl. No. 16/214,477, dated Aug. 3, 2020, 7 pages. Restriction Requirement.
Third Party Observation (no English translation available) for Japanese Patent Application No. 2019-542624, dated Jul. 10, 2020, 1 page.
Official Action (with English translation) for Japanese Patent Application No. 2019-542624, dated Sep. 15, 2020, 7 pages.

\* cited by examiner

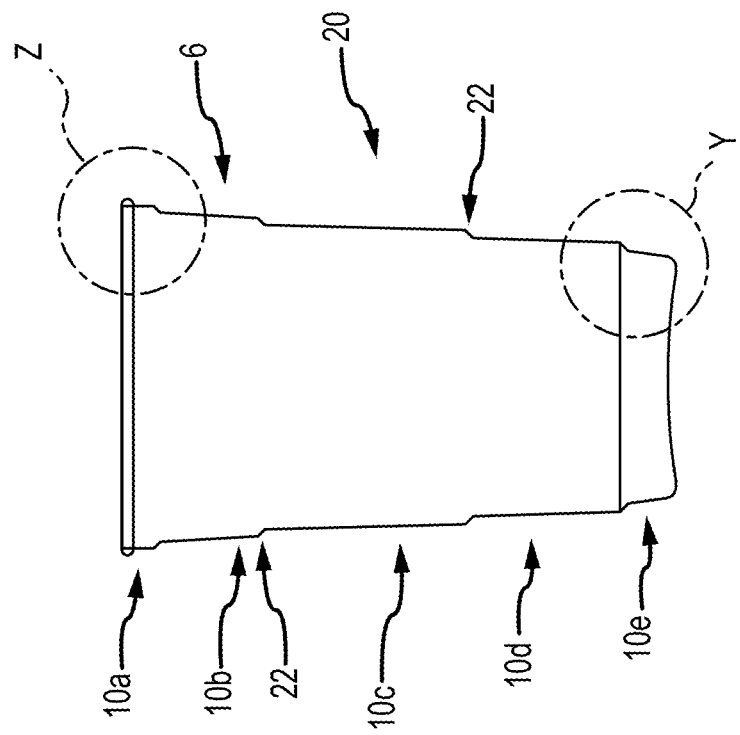
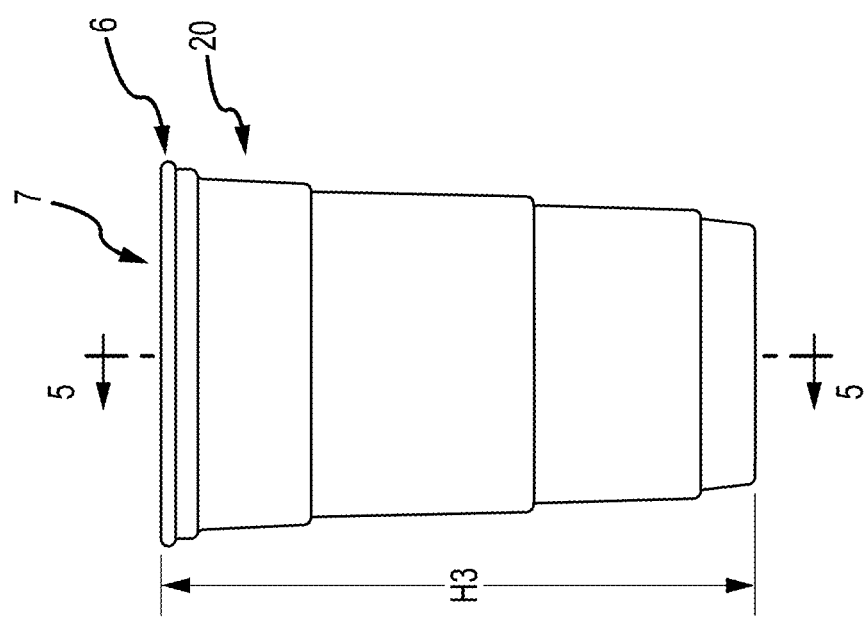

TAPERED METAL CUP AND METHOD OF FORMING THE SAME

This U.S. Non-Provisional Patent Application claims the benefit of priority from U.S. Provisional Patent Application Ser. No. 62/455,697, filed Feb. 7, 2017, the entire disclosure of which is hereby incorporated by reference in its entirety.

FIELD

The present disclosure relates generally to metal cups and methods of forming the same. More specifically, the present disclosure relates to beverage cups formed from a metal. Various embodiments of the present disclosure provide for a thin-walled beverage cup that is stackable with cups of similar construction.

BACKGROUND

Existing disposable beverage cups and drinking containers typically comprise a plastic material. Plastic cups are manufactured from injection molding or thermoforming operations, whereby many lightweight and disposable cups may be formed. Existing metallic beverage containers generally comprise drinking cans including an end closure secured to the upper end of a filled can.

U.S. Pat. No. 4,366,696 to Durgin et al., which is hereby incorporated by reference in its entirety, discloses a nestable can and method of forming the same from a blank. Durgin et al., however, fail to disclose various features of the present disclosure including, for example, a tapered or stepped geometry as shown and described herein and methods of forming the same.

U.S. Pat. No. 4,914,937 to Bulso et al., which is hereby incorporated by reference in its entirety, discloses a method of forming a tapered container. Bulso et al. provide a straight-walled cup and a method of forming the same, but is devoid of various teachings of the present disclosure.

U.S. Pat. No. 6,463,776 to Enoki et al., which is hereby incorporated by reference in its entirety, discloses a manufacturing method for bottle-shaped cans with a neck and shoulder portion. Enoki et al. fail to disclose various features and methods of the present disclosure. For example, Enoki et al. fail to provide a cup-shaped container with tapered, straight sidewalls.

SUMMARY

Accordingly, there has been a long-felt and unmet need to provide a metal cup that is reusable and recyclable. There has also been a need to provide a tapered metal cup that is stackable to enhance shipping and storing of a plurality of cups.

In various embodiments, a tapered metal cup is provided that comprises shallow wall angles. Shallow wall angles, at least as used herein, comprise wall angles that are less than 10 degrees as measured from a vertical center line or vertical axis of the cup. The angular sides and shallow wall angles of cups as shown and described herein allow for stackability of at least two cups, which provides advantages for shipping and storage.

In various embodiments, metal cups are provided comprising thin-walled aluminum. Preferably, metal cups are provided comprising a recycled aluminum alloy. Various embodiments, including those comprising thin-walled aluminum provide cups that are lightweight, are formed of a recycled and/or recyclable material, and are more rigid, useful, and durable than conventional plastic cups, for example.

In preferred embodiments, a metal cup is provided with a constant wall thickness along at least a portion of the cup. An incoming gauge of the cup is reduced to a thinner wall thickness in the sidewalls of the cup. Horizontally-extending steps or ribs preferably extend around an entire circumference of the cup, and are provided to add strength to the finished cup while maintaining a lightweight character of the cup. The steps or ribs are provide as transition points between sections of the finished cup having different diameters. Alternatively, a tapered cup is provided without ribs, where the cup comprises a relatively smooth and linear sidewall which extends from the upper end of the tapered cup to the closed lower end.

In various embodiments, a method of forming a metal cup is provided. In one embodiment, a method of forming a metal cup comprises feeding an aluminum coil into a cupping press and producing a straight-walled cup from a substantially circular blank cut from the aluminum coil. The cup preferably has a constant wall thickness that is approximately equal to the incoming gauge of the aluminum. The cup is then fed into a bodymaker where the metal is ironed. The cup is further formed by washing the cup, and decorating and/or coating an outside and an inside of the cup. In certain embodiments, at least a portion of the exterior of the cup is decorated with a color, a logo, or other visual information. Subsequent to washing and coating operations, a top edge of the cup is curled partially curled, or throttled to eliminate the sharp edge that is formed by the press. The cup is then drawn down in diameter and multiple straight wall sections are formed. Each of the straight wall sections is expanded to a larger diameter using a die with a tapered profile. Finally, a bottom dome is provided in the bottom wall of the cup wherein the dome provides enhanced structural stability to the cup. In various embodiments, a dome is provided in the bottom of a metal cup to provide enhanced strength and stackability features. It should be recognized, however, that the term "dome" is not limited to any particular geometric shape and is contemplated as including, without limitation, conical and frustoconical "dome" members. The present disclosure contemplates that a central bottom portion of the cup is positioned vertically above a standing surface of the cup.

In another embodiment, a method is provided wherein a bodymaker step is eliminated in favor of multiple redraw steps after the cupper. In this case the cup maintains a constant wall thickness through the entirety of the container.

In one embodiment, a method of forming a tapered metallic cup is provided, the method comprising the steps of providing a stock metal material; forming at least one cup using a blank and draw operation; performing a redrawing operation on the cup to provide the cup with a predetermined height and a wall thickness; subsequent to the redrawing operation, trimming the cup to a second height; curling the top edge of the trimmed cup to form a lip; forming one or more straight wall sections in the cup by drawing the cup; expanding each of the one or more straight wall sections using one or more dies with a tapered profile; and forming a dome in the bottom of the cup.

In another embodiment, a method of forming a tapered metallic cup is provided, the method comprising the steps of providing a stock metal material; forming at least one cylindrical preform from the stock material; trimming the cylindrical preform to a second height; curling a top edge of the trimmed cylindrical preform to form a lip; forming a cup by providing one or more straight wall sections in the cylindrical preform by drawing the preform; expanding each of the one or more straight wall sections to a larger diameter using one or more dies with a tapered profile; and forming a dome in the bottom of the cup.

In one embodiment, a tapered metallic cup is provided. The tapered metallic cup comprises an upper end and a lower end, and a height extending between the upper end and the lower end. The upper end comprises a curled, partially curled, or throttled lip and an opening. A plurality of tapered sections are provided between the upper end and the lower end, with a step provided between each of the tapered sections. Each of the tapered sections comprises a substantially constant wall thickness and a tapered profile. Adjacent tapered sections of the plurality of tapered sections comprise successively smaller diameters, and the step provided between each of the tapered sections comprises a transition in diameter.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
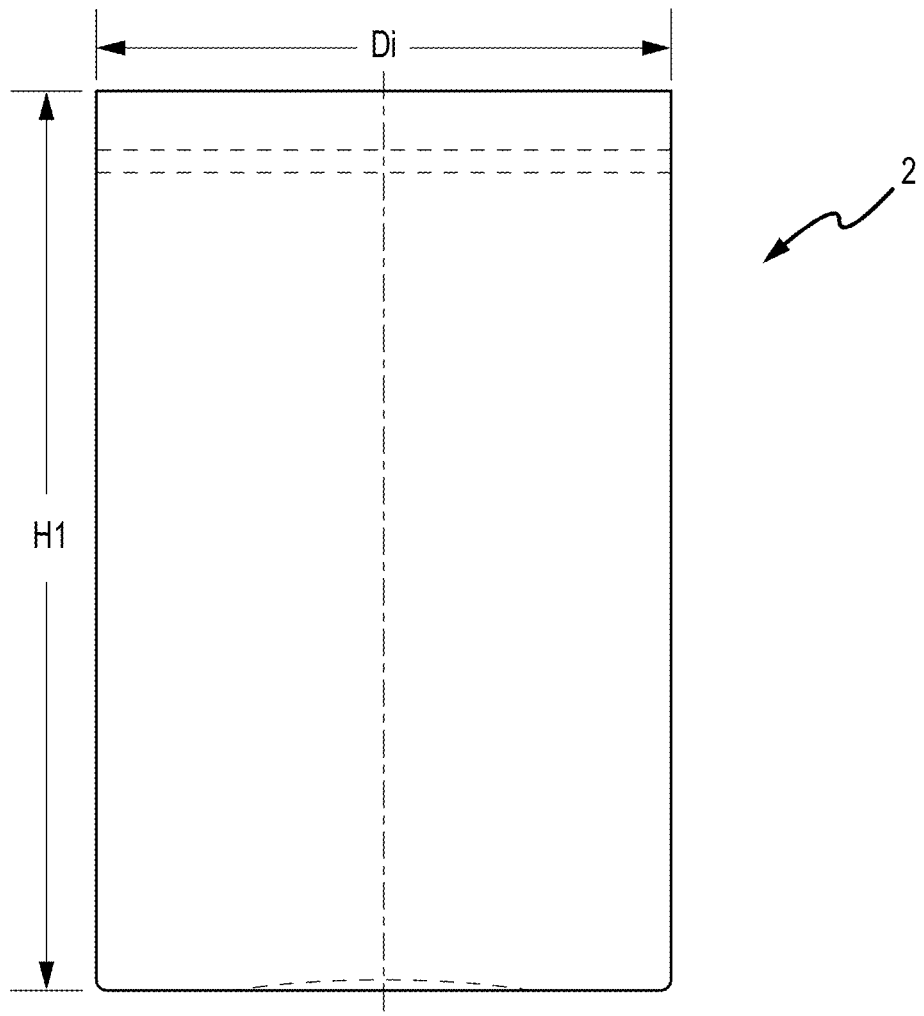

FIG. 1 is a front elevation view of a container body in one stage of formation and according to one embodiment of the present disclosure.

Figure 2:
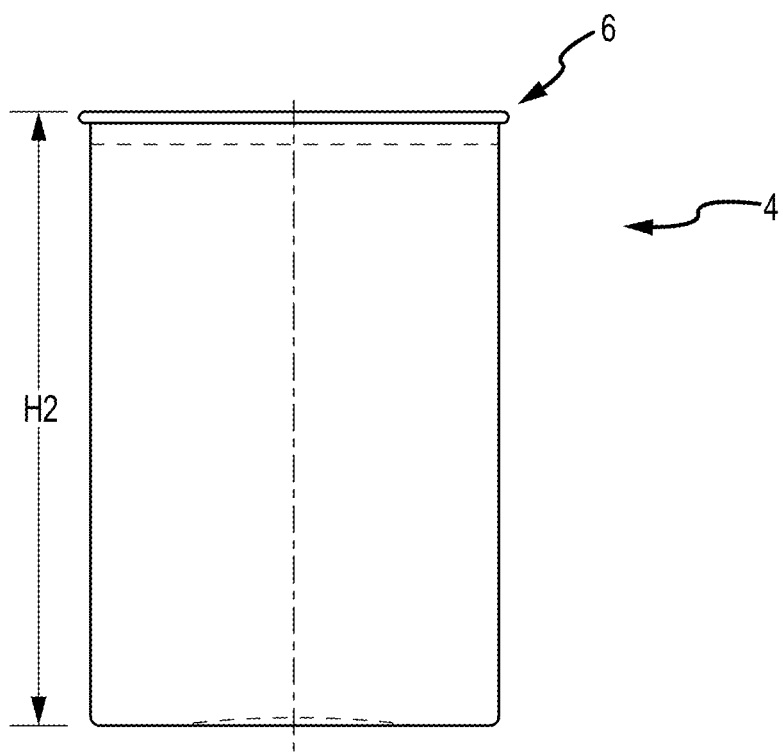

FIG. 2 is a front elevation view of a container body in one stage of formation and according to one embodiment of the present disclosure.

Figure 3:
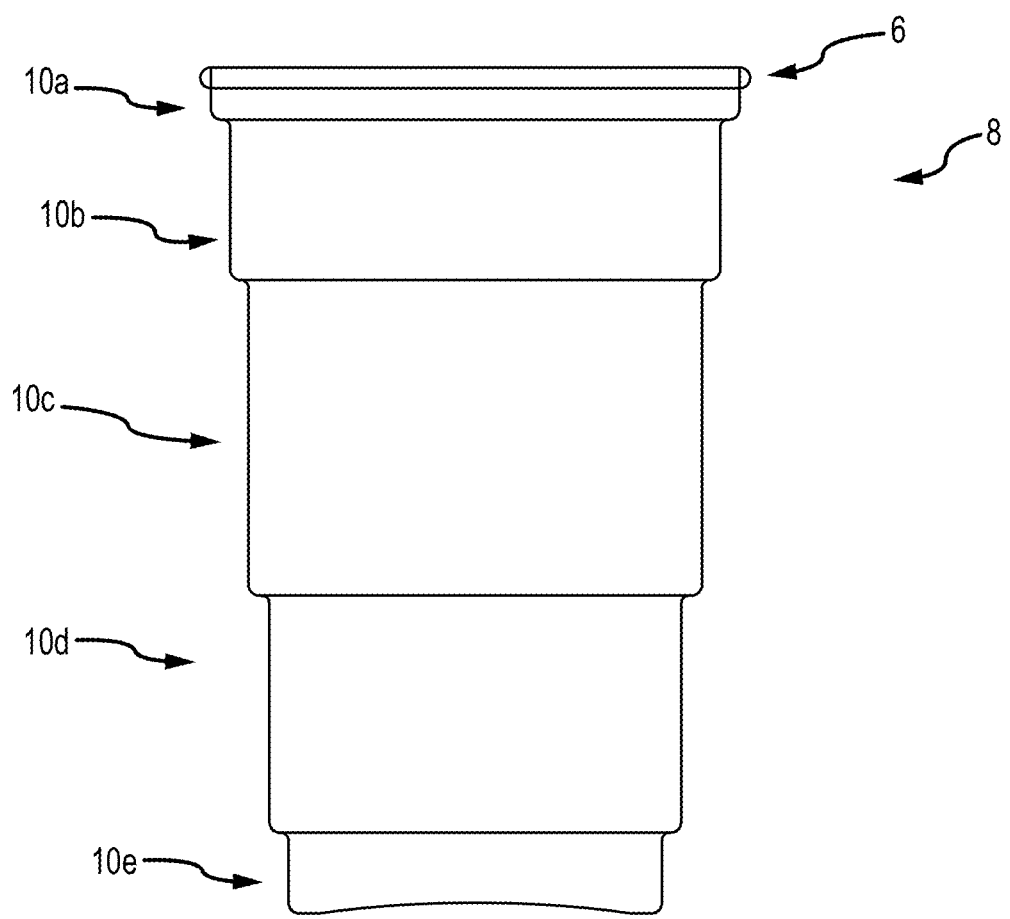

FIG. 3 is a front elevation view of a metal container according to one embodiment of the present disclosure.

FIG. 4 is a front elevation view of a stackable metal container according to one embodiment of the present disclosure.

FIG. 5 is a cross-sectional elevation view of the container according to the embodiment of FIG. 4 and taken at section A-A.

Figure 6:
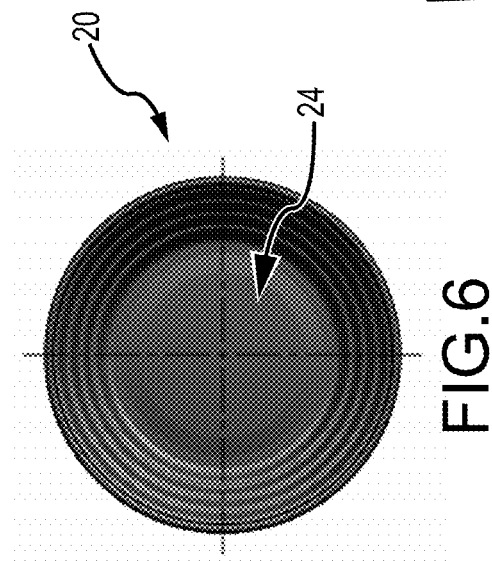

FIG. 6 is a top plan view of the container according to the embodiment of FIG. 4.

Figure 7:
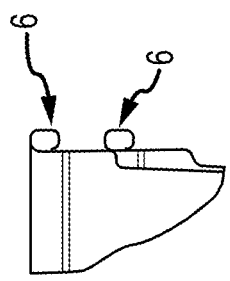

FIG. 7 is a detailed elevation view of a portion of multiple containers stacked according to one embodiment of the present disclosure.

Figure 8:
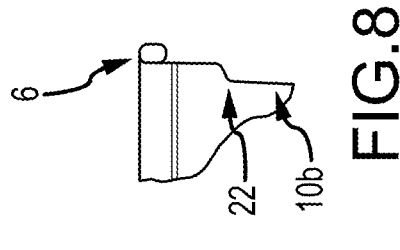

FIG. 8 is a detailed elevation view of a portion of a container according to one embodiment of the present disclosure.

Figure 9:
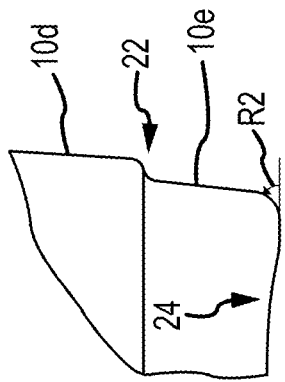

FIG. 9 is a detailed elevation view of a portion of a container in accordance with the embodiment of FIG. 4.

Figure 10:
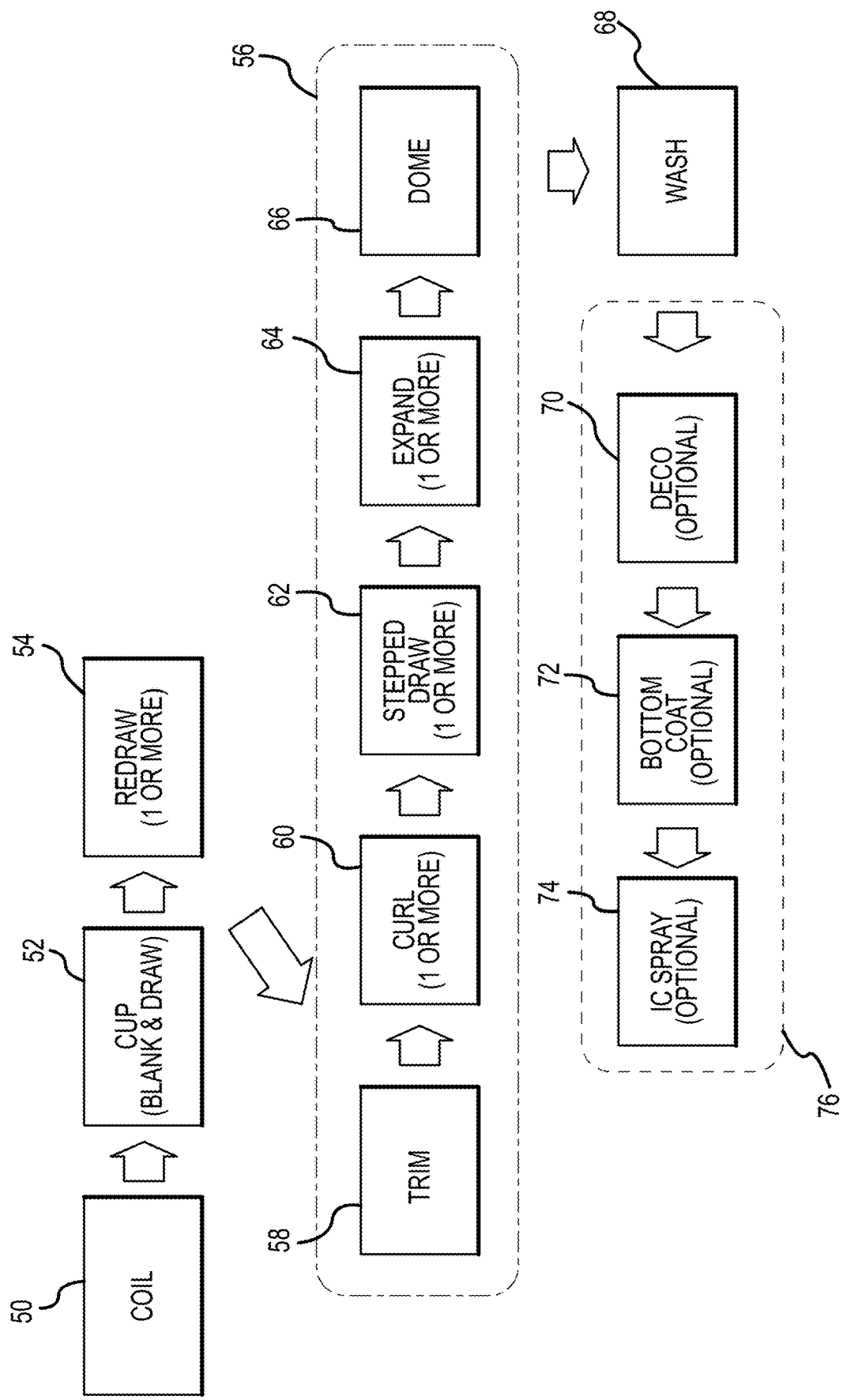

FIG. 10 is a flow chart depicting a method of forming a metal cup according to one embodiment of the present disclosure.

Figure 11:
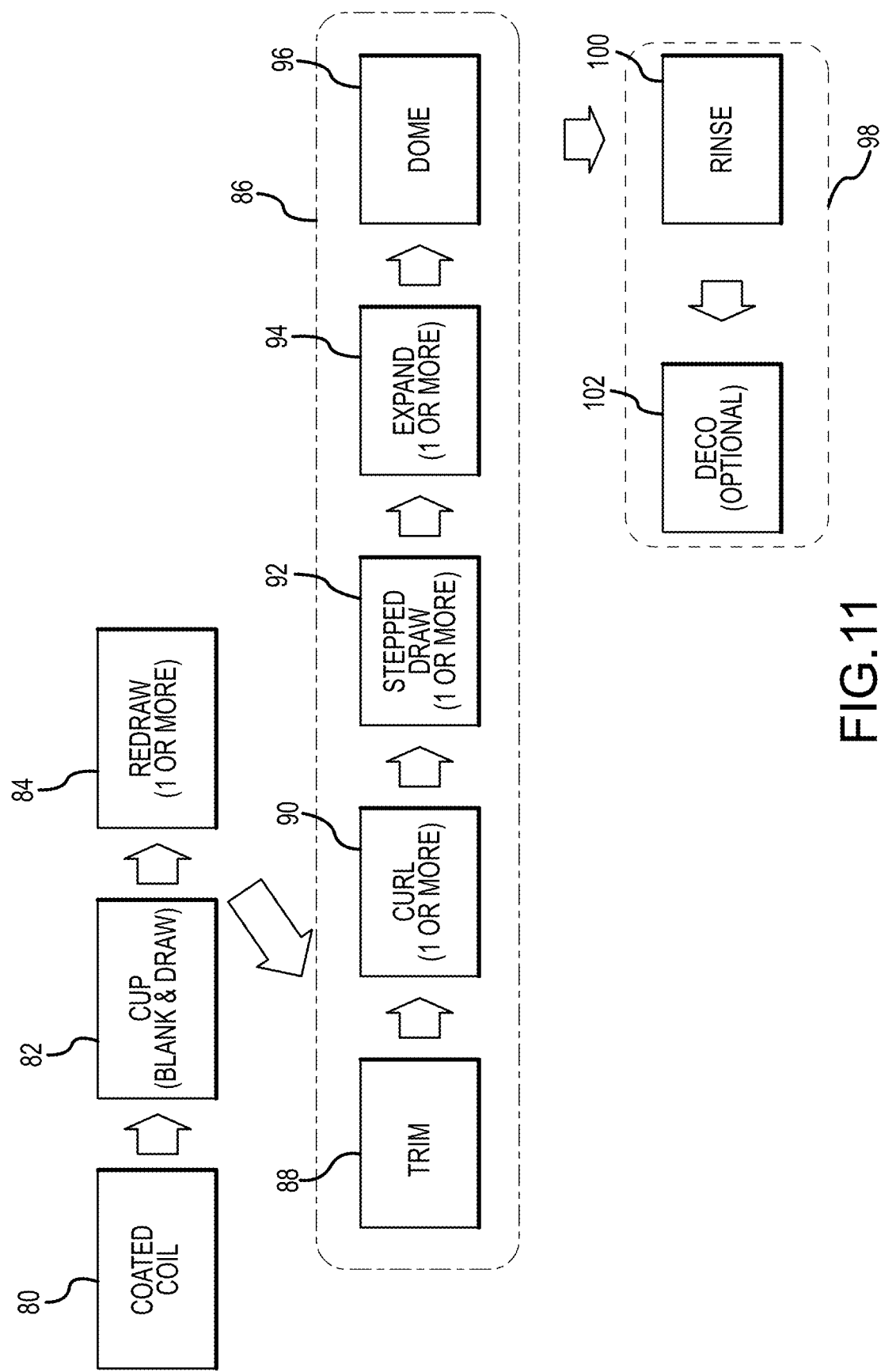

FIG. 11 is a flow chart depicting a method of forming a metal cup according to one embodiment of the present disclosure.

Figure 12:
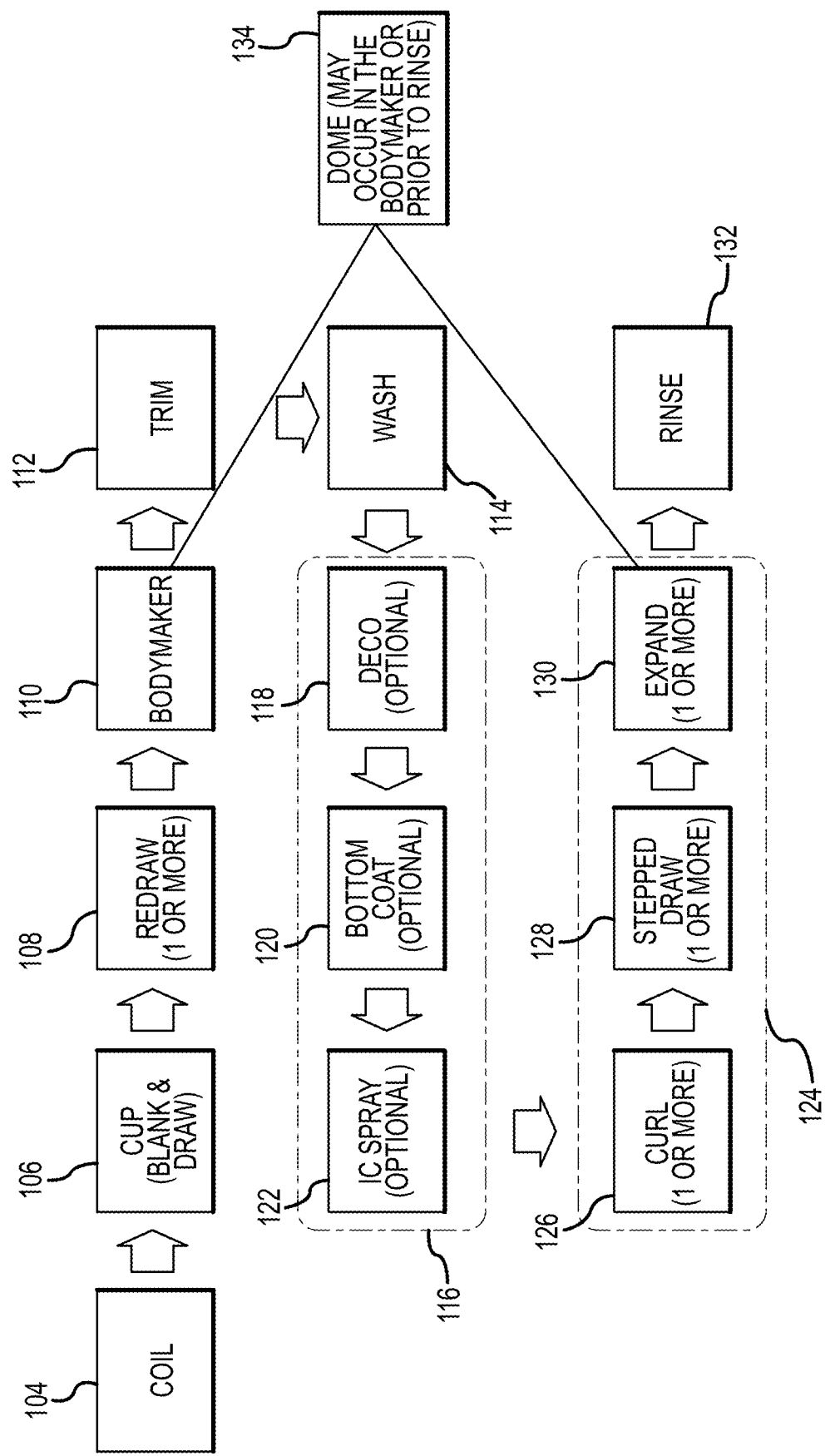

FIG. 12 is a flow chart depicting a method of forming a metal cup according to one embodiment of the present disclosure.

Figure 13:
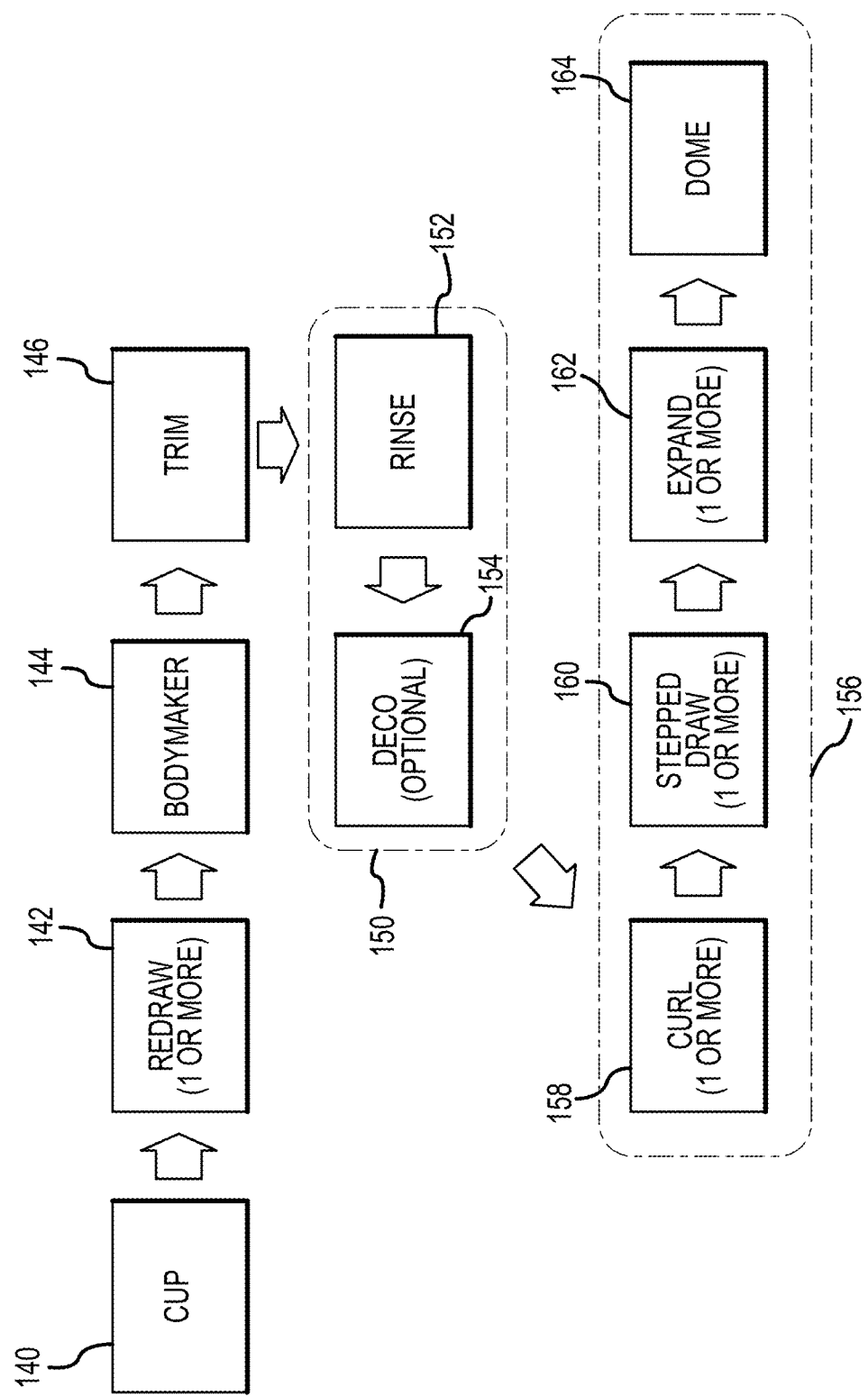

FIG. 13 is a flow chart depicting a method of forming a metal cup according to one embodiment of the present disclosure.

Figure 14:
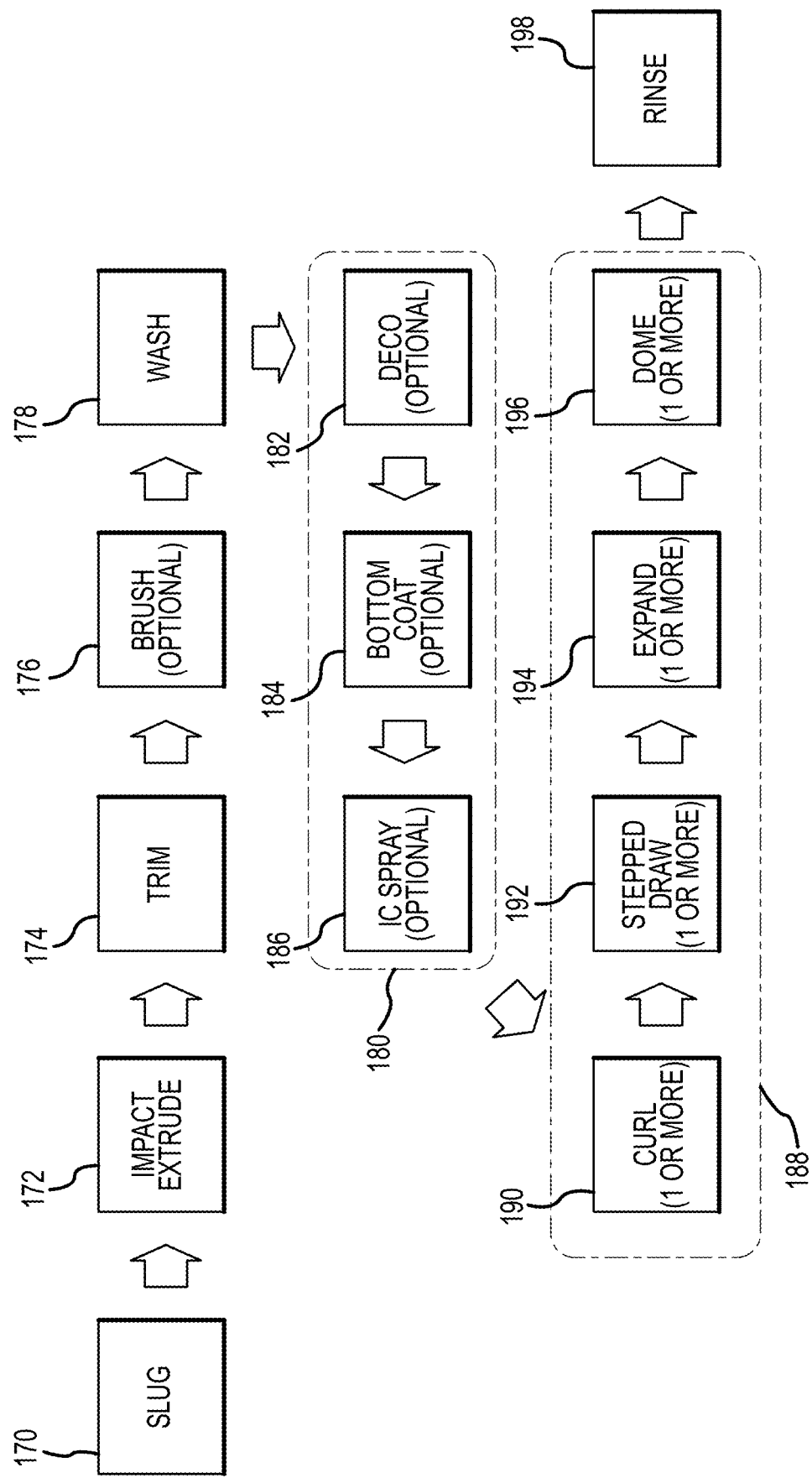

FIG. 14 is a flow chart depicting a method of forming a metal cup according to one embodiment of the present disclosure.

DETAILED DESCRIPTION

FIG. 1 is a front elevation view of a straight-walled preform 2. The preform 2 represents an initial forming stage of a metal cup according to one embodiment of the present disclosure. The straight-walled preform 2 is preferably formed by feeding a quantity of metal (e.g. aluminum) into a cupping press and forming a preliminary drawn cup from a blank sheet cut from a coil of metal material. The resulting straight-walled drawn cup preferably comprises a constant wall thickness that is approximately equal to the incoming gauge of the metal fed into the cupping press. The preliminary drawn cup is then fed into a bodymaker wherein the metal is ironed. The resultant straight-walled preform 2 comprises a sidewall where the base comprises a thickness approximately equal to an incoming gauge of metal, and the sidewall comprises a thin-wall portion and a thick-wall portion. The straight-walled preform 2 comprises an initial diameter Di that generally corresponds to and is approximately equal to the diameter of the punch that forms the cup. In various embodiments, the initial diameter Di is between approximately 2.0 inches and 6.0 inches. In preferred embodiments, the initial diameter Di is between approximately 3.0 and 4.0 inches, and more preferably is of approximately 3.290 inches.

The straight-walled preform 2 comprises a height H1 of between approximately 3.0 and 10.0 inches. In preferred embodiments, the preform 2 comprises a height H1 of between approximately 3.5 and 5.5 inches, and more preferably of approximately 4.463 inches. A bottom portion of the preform comprises a radius of curvature resulting from the shape and contact of the punch used to form the cup. In various embodiments, this radius R is between approximately 0.025 inches and 0.250 inches, and preferably of approximately 0.059 inches.

FIG. 2 is a front elevation view of a curled preform cup 4 in a further phase of the formation. The curled preform 4 of FIG. 2 comprises the thin-walled preform 2 of FIG. 1, and wherein a curl 6 is provided on the upper edge or lip of the cup. The curl 6 is provided to eliminate a sharp edge, provide added rigidity, and provide a means for removal from draw tooling. As shown in FIG. 2, the curled preform cup 4 comprises a reduced height as compared to the preform 2 of FIG. 1. Specifically, the curled preform cup 4 of FIG. 2 comprises a height H2 of between approximately 4.5 and 5.5 inches, and preferably of approximately 4.947 inches.

Prior to or subsequent to the forming of the curl 6, the preform 4 may be washed, coated, and/or decorated. It is contemplated that at least one of the inside and the outside of the preform is coated with epoxy resin and/or other materials that will be recognized by one of ordinary skill in the art. The cup is coated to protect the aluminum from oxidization and to prevent leaching of aluminum into cup contents. It is further contemplated that an inside and/or outside of the cup is provided with paint or other ornamental treatment.

FIG. 3 is a front elevation view of a straight drawn cup 8 according to one embodiment of the present disclosure and formed from the curled preform cup 4 of FIG. 2. As shown, the straight drawn cup 8 comprises a curl 6 at an upper end or lip of the cup.

The straight drawn cup 8 further comprises a plurality of sections 10a, 10b, 10c, 10d, 10e wherein the sections each comprise straight-wall sections of successively smaller diameter and varying height, as shown in FIG. 3. FIG. 3, as well other Figures of the present disclosure, are provided with dimensions. These dimensions are provided by way of example only and illustrate cups and features according to certain embodiments. It will be expressly recognized that devices, inventions and features of the present disclosure are not limited to the dimensions provided in the drawings, and various modifications and proportions are contemplated. The straight drawn cup 8 of FIG. 3 comprises an intermediate phase of the forming process of a cup of the present disclosure.

As shown in FIG. 3, the straight drawn cup 8 comprises a plurality of sections 10, wherein each of the sections 10 comprise a successively smaller diameter from an upper end to a lower end of the straight drawn cup 8, wherein the uppermost section 10a comprises the largest diameter, and the lowermost section 10e comprises the smallest diameter. The sections comprise varying heights, wherein the relative heights can be characterized as: $10c>10d>10b>10e>10a$. As shown in FIG. 3, the straight drawn cup 8 comprises five sections and four ribs. The number of sections and ribs may vary depending on consumer requirements. The section heights may also vary depending on consumer requirements.

FIGS. 4-5 illustrate a finished tapered metallic tapered cup 20 according to one embodiment of the present disclosure. The tapered cup 20 is preferably formed from the straight drawn cup 8 of FIG. 3 by expanding each of the straight walled sections 10 to a larger diameter (as compared to that shown in FIG. 3) using a die (not shown) with a tapered profile.

As further shown in FIG. 4, the finished tapered cup 20 is expanded to a final height H3 that is greater than H2. Specifically, the finished tapered cup 20 comprises a height H3 that is between approximately 4.5 and 6.50 inches, and preferably of approximately 5.330 inches. The final height H3 is produced by an expansion die during a final forming process. An opening 7 is provided at the upper end of the tapered cup 20, wherein the opening is devoid of a closure, a seal, etc. The opening is at least partially defined by the circumference of the curled portion 6, and wherein the curled portion 6 comprises at least a portion of a user-interface wherein a user's mouth is intended to contact the curled portion 6 during drinking.

FIG. 5 is a cross-sectional elevation view of the tapered metallic tapered cup 20 as shown in FIG. 4, and wherein the cross-section is taken at line A-A of FIG. 4. As shown in FIG. 5, the tapered cup 20 comprises a tapered profile comprising multiple stepped sections 10a, 10b, 10c, 10d, 10e, wherein each successive section comprises a smaller diameter by way of a step 22. Additionally, each section comprises an angled or tapered sidewall formed by a tapered expansion die.

Various internal diameters of a plurality of sections 10 are provided. In preferred embodiments, a finished tapered cup 20 comprises a plurality of sections 10 comprising relative diameters characterized as: $10a>10b>10c>10d>10e$. Specific diameters are provided and illustrated as being measured from an upper portion of each respective section 10. The plurality of sections 10 comprise varying heights, wherein the relative heights can be characterized as: $10c>10d>10b>10e>10a$. An internal diameter of a curled section 6, which also comprises a drinking interface, comprises a diameter of between approximately 2.0 and 5.0 inches, and preferably of approximately 3.290 inches. Details Y and Z are indicated on FIG. 5, and are shown in detail in FIGS. 9 and 8, respectively. Various expansion angles are illustrated in FIG. 5, wherein each section 10 expands outwardly along a height of the section 10. As shown, each section 10 comprises a different expansion angle (expressed as a percentage of the diameter over the height of the section). In alternative embodiments, however, it is contemplated that each section 10 comprises the same expansion angle. In the depicted embodiment, the relative expansion angles can be expressed as: $10e>10b>10d>10c$. The uppermost section 10a provided in FIG. 5 comprises a straight-walled section that is devoid of an expansion angle.

The straight wall sections of FIG. 5 are contemplated as being formed by drawing the cup and providing an expansion or increased diameter to each of the sections. In some embodiments, it is contemplated that each of the sections is formed using a draw and, subsequent to the initial formation of each of the drawn sections, one or more expansion dies are provided to expand each of the sections. In other embodiments, it is contemplated that the drawing and expanding of the straight wall sections are performed in an alternating manner wherein a first section is drawn and then expanded, a second section is then drawn and expanded, etc. It is also contemplated that the number of draw and expansion operations need not be equal. For example, multiple expansion steps may be provided on a portion formed from a single draw operation. Additionally, a section may be drawn and not provided with a corresponding expansion operation.

FIG. 6 is a top plan view of a finished tapered cup 20 according to the embodiment of FIG. 4. Multiple stepped sections 10 are shown in plan view, and a bottom of the tapered cup 20 comprises a dome 24 in some embodiments.

FIG. 7 is a detailed view of two finished tapered cups 20 provided in a stacked arrangement, and wherein respective curled portions 6 of each tapered cup 20 are provided with a separation or stand-off height. A stand-off height is provided that comprises a height or distance between successive upper ends of the curled portions 6. In the depicted embodiment, the stand-off height is between approximately 0.00 inches and approximately 1.0 inches. Preferably, the stand-off height is approximately 0.28 inches. The stand-off height provides a user with the ability to grasp and separate stacked cups, for example. Although various embodiments contemplate a stand-off height, such a stand-off feature is not required and alternative embodiments contemplate that such a stand-off is not provided.

FIG. 8 is a detailed cross-sectional elevation view of a finished tapered cup 20 showing the upper portion of the cup including the curl 6. FIG. 8 is a detailed view of detail Z of FIG. 5. As shown in FIG. 8, a curled portion 6 of the cup comprises a radius of curvature of between approximately 0.010 inches and 0.250 inches. In the depicted embodiment, a preferred radius of curvature comprises a curvature of approximately 0.040 inches. FIG. 8 also provides a step 22 between adjacent sections 10a, 10b of a tapered cup 20. As shown, the step comprises a first radius of curvature of approximately 0.040 inches and a second radius of approximately 0.040 inches, wherein the two radii of curvature each comprise a transition or departure from an adjacent sidewall of the sections 10a, 10b. Although only one step 22 is depicted in FIG. 8, it is contemplated that each step 22 of the tapered cup 20 is provided comprising the same dimensions as the step 22 shown in FIG. 8. The step 22 can be of any dimension or combination of one or more radii.

FIG. 9 is a detailed cross-sectional elevation view of a finished tapered cup 20 showing the bottom portion of the tapered cup 20 comprising a dome 24. FIG. 9 is a detailed view of detail Y of FIG. 5. FIG. 9 includes various dimensions and details of a tapered cup 20 according to one embodiment of the present disclosure. As shown, the tapered cup 20 comprises a dome 24 in a lower portion of the preform 20. A bottom portion 10e of the cup comprises an outer diameter of between approximately 1.50 and 3.50 inches, and preferably of about 2.349 inches. A radius of curvature R2 is provided as a transition between the bottom section 10e and the dome, wherein the radius of curvature R2 comprises a radius of between approximately 0.010 inches and approximately 0.250 inches. Preferably, the radius of curvature is approximately 0.10 inches. A flat standing surface 30 is provided between the radius R2 and the dome 24, wherein the flat surface 30 comprises a resting or supporting for the finished preform 20. The flat surface 30 generally comprises an annular surface with a width of between approximately 0.0010 inches and 0.125 inches, and preferably of approximately 0.084 inches. The flat surface 30 extends into a domed section 24 comprising multiple radii of curvature. A central portion of the domed feature 24 comprises a radius of approximately 15.0 inches, and the domed portion 24 transitions to a flat surface 30 as shown. The domed portion 24 and the dimensions thereof may vary in dimensions. In further embodiments, a flat standing surface is not provided.

As shown in FIG. 9, a bottom section 10e of the cup comprises a gauge or wall thickness of approximately 0.0090 inches, and an adjacent section 10d, comprises a gauge or wall thickness of approximately 0.0040 inches. The bottom section 10e comprises a section of enhances gauge and therefore comprises enhanced durability as the bottom section 10e is intended to contact another surface, such as when the cup is placed on a surface, dropped, etc. In certain embodiments, the cup comprises a single metal thickness.

FIG. 10 is a flow chart depicting a method of forming a metal cup according to one embodiment of the present disclosure. As shown, the method of FIG. 10 comprises a first step 50 of providing a coil of metal material from which a cup is to be formed. Preferably, the coil provided in step 50 comprises a coil of aluminum stock material. A second step 52 is provided wherein at least one cup is formed from a blank cut from the coil. The cup is preferably formed using a blank and draw operation. Subsequently, a redraw step 54 is provided wherein the cup is subjected to at least one redraw operation. Method steps 50, 52 and 54 provide an initial cup that is ready for further processing according to methods of the methods of the present disclosure.

The cup provided from the redraw step 54 is further subjected to forming and finishing steps as shown and described herein. In the depicted embodiment of FIG. 10, the cup is subjected to a trimming operation wherein an upper, open end of the cup is cut or trimmed to remove material at step 58. Subsequently, at step 60, the upper trimmed end of the cup is provided with at least one curl (see 6 of FIG. 2, for example). Subsequently, and referring now to step 62, at least one stepped draw operation is performed wherein multiple straight-wall sections are formed in the cup (see FIG. 3, for example). The cup is then expanded via at least one expansion operation in step 64. In some embodiments, the expansion step 64 comprises expanding each of the straight wall sections to a larger diameter using one or more dies with a tapered profile. A doming operation 66 is then performed to provide a dome in a bottom portion of the cup. The dome is probably provided to enhance the structural integrity and stability of the cup. The series of steps described herein and referenced as sequence 56 comprise steps that are contemplated as being re-ordered or eliminated depending on design, customer requirement, and/or machine technology. While at least one embodiment contemplates performing the steps as illustrated in FIG. 10, it is also contemplated that one or more of the steps indicated by 56 may be eliminated or re-sequenced.

Subsequent to the sequence illustrated as 56 in FIG. 10, the cup is then subjected to a washing step 68. After washing, the cup is decorated at step 70, provided with a bottom coat at step 72, and/or an internal coating ("IC") spray step 74. The plurality of method steps indicated by 76 in FIG. 10 are contemplated as being re-ordered or eliminated depending on design, customer requirement, and/or machine technology. For example, depending on customer needs and requirement, the method may terminate after a decoration step 70.

FIG. 11 is a flow chart depicting a method of forming a metal cup according to another embodiment of the present disclosure. As shown, an initial step 80 is provided wherein a coated coil is provided in the form of stock material. Preferably, the coil in step 80 comprises coated aluminum. However, various embodiments of the present disclosure provide and contemplate a "coated" coil that comprises an epoxy, film, polymer or other "paint" cured, laminated or extruded to a surface of the metal using various methods. At least one cup is formed from the coil at step 82, the cup being formed from a blank sheet of material cut from the coil and a draw die. The initial cup formed in step 82 is then subjected to at least one redraw operation in step 84. Having formed an initial cup, the process advances to step 88 where an upper, open portion of the cup is trimmed in step 88, subsequently provided with a curl at step 90, subjected to a stepped redraw operation at step 92 to form at least one straight-walled portion, expanded in diameter at step 94, and provided with a bottom dome through a doming operation at step 96. Steps 88-96 of FIG. 11 are collectively referred to as sequence 86. The steps of this sequence 86 are contemplated as being re-ordered or eliminated depending on design, customer requirements, and/or machinery.

Subsequent to the method steps of the depicted sequence 86, the cup is then subjected to a rinsing or washing operation 100 and a decorating step 102. In FIG. 11, washing and decorating are depicted as a final sequence 98 in which the cup is finished. It is also contemplated, however, that the sequence 98 can be provided subsequent to the redraw step 84 and prior to sequence 86.

FIG. 12 is a flow chart depicting a method of forming a metal cup according to another embodiment of the present disclosure. As shown in FIG. 12, a plurality of initial cup forming steps are provided wherein a coil 104 is provided. At least one cup is formed from the coil material at step 106, preferably by a blank and draw operation. A redraw step 108 is provided to further form the cup, which is then provided within a bodymaker at step 110 to form the final cup height. An upper portion of the cup is then trimmed at step 112. The trimmed cup is then preferably subjected to a washing operation 114. A decorating and/or coating sequence 116 is provided subsequent to washing, the decorating sequence comprising the steps of decorating the cup at step 118, providing a bottom coat 120, and/or providing an internal coating to the cup at step 122. One or more of the steps of the coating sequence 116 may be reordered, eliminated, and/or moved after a rinsing step 132.

Preferably subsequent to the coating sequence 116, final forming steps 124 are provided. The final forming steps preferably comprise at least one of providing a curl to the trimmed portion of the cup at step 126, performing at least one stepped draw operation 128 to form one or more straight walled section in the cup, and performing an expansion step 130 to expand the diameter of the straight walled section(s). The final forming steps 124 are contemplated as being reordered or eliminated depending on user requirements. A rinsing step 132 is provided as a finishing step. However, as previously noted, one or more steps of the coating sequence 116 may be re-ordered such that they occur subsequent to the rinsing step 132. The embodiment of FIG. 12 contemplates providing a dome in a bottom portion of the cup. A doming operation 134 is provided and is contemplated as occurring during the bodymaker operation 110 or prior to rinsing as a final, separate operation.

FIG. 13 is a flow chart depicting a method of forming a metal cup according to another embodiment of the present disclosure. As shown in FIG. 13, a cup is provided at step 140 and is preferably formed from a coil of blank aluminum. The cup is then redrawn at step 142, wherein the cup is subjected to one or more redraw operations. The cup is then fed to a bodymaker at step 144 to form a final cup height and diameter. Subsequently, the cup is trimmed at step 146 wherein an excess cup height created from the redrawing and/or bodymaker operation is trimmed. A cleaning and decorating sequence 150 is provided wherein the cup is subjected to at least one of a rinsing step at 152 and a decorating step 154. The steps of the cleaning and decorating sequence 150 may be moved after the expansion 162 or doming step 164 provided in FIG. 13.

The cup is then advanced to finishing sequence 156, wherein the finishing sequence comprises providing a curl to the trimmed portion of the cup at step 158, providing a stepped redraw operation 160, providing an expansion operation 162 and providing a dome in a bottom portion of the cup at step 164. although the doming step 164 is contemplated as occurring a final step in the embodiment of FIG. 13, it is also contemplated that the doming step may occur within the bodymaker at step 144, making the expansion operation 162 the final step of the embodiment of FIG. 13. The steps of the finishing sequence 156 of FIG. 13 may be re-ordered or eliminated depending on design, customer requirement, and/or machine technology.

FIG. 14 is a flow chart depicting a method of forming a metal cup according to another embodiment of the present disclosure. As shown in FIG. 14, a cup is provided from a slug of blank material. As shown, an initial step 170 comprising providing a slug of material (e.g. aluminum). The slug is impact extruded at step 172 to form a cup. An upper end of the cup is trimmed to a preferred height at step 174 and subsequently brushed and washed at step 176 and 178, respectively. In some embodiments, a step of ironing the impact-extruded cup is provided after impact extrusion (step 172) and prior to trimming (step 174). A washed cup 178 is then provided and subjected to a coating and decorating sequence 180 as shown. The coating and decorating sequence 180 of FIG. 14 comprises the steps of decorating the cup 182, providing a bottom coat to the cup 184 and providing an internal coating (e.g. sprayed coating) to the cup 186. The steps of the coating and decorating sequence 180 may be reordered and/or may be provided subsequent to the rinsing step 198.

After the coating and decorating sequence 180, the method of FIG. 14 proceeds to a finishing sequence 188 that comprises the steps of curling an upper, trimmed portion of the cup at step 190, performing a stepped draw operation 192, providing an expansion operation using one or more expansion dies 194 and forming a dome 196 in a bottom portion of the cup. The steps of the finishing sequence may be re-ordered or eliminated depending on user preference, design, customer requirements, and/or available machine technology. Subsequent to the finishing sequence 188, the cup is washed and/or rinsed at step 198.

Various features and embodiments of a metal cup have been provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention(s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A method of forming a thin-walled tapered metallic cup, the method comprising:
   providing a stock material;
   cutting a blank from the stock material;
   forming the cup from the blank by performing a draw operation;
   performing a redrawing operation on the cup to provide the cup with a predetermined height and a wall thickness;
   subsequent to the redrawing operation, trimming the cup;
   curling the top edge of the cup to form a lip;

performing a plurality of further drawing steps to form a plurality of straight walled sections and wherein each of the straight walled sections comprise successively smaller diameters;

subsequent to the plurality of drawing steps, expanding each of the straight walled sections to a larger diameter with a die comprising a tapered profile; and wherein the step of expanding each of the straight walled sections comprises increasing the height of the cup to a final height.

2. The method of claim 1, wherein the stock material comprises an aluminum coil.

3. The method of claim 1, further comprising a step of providing a coating on at least an interior of the cup.

4. The method of claim 1, further comprising performing at least one of a decorating step and a coating step.

5. The method of claim 1, wherein the step of curling the top edge occurs prior to the step of forming the plurality of straight wall sections.

6. The method of claim 1, wherein the stock material comprises a pre-coated aluminum coil, thereby reducing a need for additional washing and coating steps in the formation of the cup.

\* \* \* \* \*